US008675846B2

(12) United States Patent
Sapp et al.

(10) Patent No.: US 8,675,846 B2
(45) Date of Patent: *Mar. 18, 2014

(54) SYSTEM AND METHOD FOR PROVIDING VOICE MESSAGING WITH DYNAMIC CONTENT

(75) Inventors: Dustin Kenneth Sapp, Fishers, IN (US); Robert Andrew Compton, Germantown, TN (US)

(73) Assignee: RPX Corporation, San Francisco, CA (US)

( * ) Notice: Subject to any disclaimer, the term of this patent is extended or adjusted under 35 U.S.C. 154(b) by 453 days.

This patent is subject to a terminal disclaimer.

(21) Appl. No.: 13/087,675

(22) Filed: Apr. 15, 2011

(65) Prior Publication Data

US 2011/0222672 A1    Sep. 15, 2011

Related U.S. Application Data

(63) Continuation of application No. 11/765,756, filed on Jun. 20, 2007, now Pat. No. 7,949,103.

(60) Provisional application No. 60/815,160, filed on Jun. 20, 2006.

(51) Int. Cl.
*H04M 1/64* (2006.01)
*H04L 12/66* (2006.01)
*G06F 7/00* (2006.01)

(52) U.S. Cl.
USPC ............... 379/142.08; 370/254; 379/88.01; 379/92.03; 379/196; 379/201.12; 379/211.02; 455/412.2; 704/270.1; 705/1.1; 707/783; 715/201

(58) Field of Classification Search
CPC ............ H04M 3/436; H04M 3/42153; H04M 3/53391
USPC ........... 370/354; 379/68, 88.01, 88.12, 88.22, 379/201.12, 210.02, 88.24, 92.03, 142.08, 379/196, 210.01, 211.02, 215.01; 455/412.2; 704/270.1, 278; 705/1.1; 707/783, 201; 715/201; 395/2.87
See application file for complete search history.

(56) References Cited

U.S. PATENT DOCUMENTS

| 5,367,609 | A | * | 11/1994 | Hopper et al. ................. 704/278 |
| 5,515,098 | A | | 5/1996 | Carles |
| 5,647,002 | A | | 7/1997 | Brunson |
| 5,848,397 | A | | 12/1998 | Marsh et al. |
| 5,852,775 | A | | 12/1998 | Hidary |
| 5,931,901 | A | | 8/1999 | Wolfe et al. |
| 5,953,700 | A | | 9/1999 | Kanevsky et al. |
| 5,991,367 | A | * | 11/1999 | Robuck ...................... 379/88.24 |
| 5,991,735 | A | | 11/1999 | Gerace |
| 6,141,413 | A | | 10/2000 | Waldner et al. |
| 6,247,065 | B1 | | 6/2001 | Greenspan et al. |

(Continued)

*Primary Examiner* — Gerald Gauthier
(74) *Attorney, Agent, or Firm* — Howison & Arnott, LLP

(57) ABSTRACT

A system and method for creating and distributing messages including dynamic content is provided. In one form, an entity provides a plurality of content segments for use in building a dynamic message. The entity also provides a listing of end users to receive a message and information associated with the user, such as demographic or prior purchasing information. In an alternate form, the service connects to the user in a communication session and collects information from the user directly. The service then uses this information, whether provided by the entity or the end user, as the basis for selection of various content segments which will make up a dynamic message for presentation to the user.

27 Claims, 7 Drawing Sheets

(56) References Cited

U.S. PATENT DOCUMENTS

| | | | |
|---|---|---|---|
| 6,366,791 B1 | 4/2002 | Lin et al. | |
| 6,519,335 B1 * | 2/2003 | Bushnell | 379/215.01 |
| 6,606,502 B1 | 8/2003 | Chung Kam Chung et al. | |
| 6,615,171 B1 | 9/2003 | Kanevsky et al. | |
| 6,807,574 B1 | 10/2004 | Partovi et al. | |
| 6,842,767 B1 | 1/2005 | Partovi et al. | |
| 6,873,693 B1 | 3/2005 | Langseth et al. | |
| 6,885,994 B1 | 4/2005 | Scroggie et al. | |
| 6,956,832 B1 | 10/2005 | Muhonen et al. | |
| 6,990,187 B2 * | 1/2006 | MacNamara et al. | 379/210.02 |
| 7,020,259 B2 * | 3/2006 | Hussain et al. | 379/211.02 |
| 7,035,653 B2 | 4/2006 | Simon et al. | |
| 7,079,632 B2 * | 7/2006 | Fellenstein et al. | 379/88.22 |
| 7,079,638 B1 * | 7/2006 | Beauchamp et al. | 379/196 |
| 7,092,728 B1 | 8/2006 | Gress et al. | |
| 7,099,659 B1 | 8/2006 | Schnake et al. | |
| 7,181,472 B2 * | 2/2007 | Cameron et al. | 707/624 |
| 7,197,461 B1 | 3/2007 | Eberle et al. | |
| 7,266,503 B2 * | 9/2007 | Cason et al. | 705/1.1 |
| 7,340,040 B1 | 3/2008 | Saylor et al. | |
| 7,486,780 B2 | 2/2009 | Zirngibl et al. | |
| 7,571,104 B2 | 8/2009 | Escott et al. | |
| 7,613,283 B1 | 11/2009 | Gilboy et al. | |
| 7,627,475 B2 | 12/2009 | Petrushin | |
| 7,676,220 B2 * | 3/2010 | Kuiken et al. | 455/412.2 |
| 7,715,538 B2 * | 5/2010 | Koch et al. | 379/142.08 |
| 7,836,045 B2 | 11/2010 | Schachter | |
| 7,865,394 B1 | 1/2011 | Calloway et al. | |
| 7,949,103 B2 * | 5/2011 | Sapp et al. | 379/68 |
| 8,051,369 B2 * | 11/2011 | Zirngibl et al. | 715/201 |
| 8,094,788 B1 * | 1/2012 | Eberle et al. | 379/88.12 |
| 8,375,056 B2 * | 2/2013 | Iorio et al. | 707/783 |
| 2002/0052781 A1 | 5/2002 | Aufricht et al. | |
| 2002/0085700 A1 * | 7/2002 | Metcalf | 379/210.01 |
| 2002/0119794 A1 | 8/2002 | Byers et al. | |
| 2002/0120929 A1 | 8/2002 | Schwalb et al. | |
| 2002/0133404 A1 | 9/2002 | Pedersen | |
| 2002/0194061 A1 | 12/2002 | Himmel et al. | |
| 2003/0115272 A1 | 6/2003 | Muttitt et al. | |
| 2003/0204568 A1 | 10/2003 | Bhargava et al. | |
| 2003/0208755 A1 | 11/2003 | Zimmerman | |
| 2003/0212745 A1 | 11/2003 | Caughey | |
| 2003/0216923 A1 * | 11/2003 | Gilmore et al. | 704/270.1 |
| 2004/0140989 A1 | 7/2004 | Papageorge | |
| 2004/0143843 A1 | 7/2004 | Khoo et al. | |
| 2004/0209649 A1 | 10/2004 | Lord | |
| 2004/0249650 A1 | 12/2004 | Freedman et al. | |
| 2005/0038698 A1 | 2/2005 | Lukose et al. | |
| 2005/0086104 A1 | 4/2005 | McFadden | |
| 2005/0125286 A1 | 6/2005 | Crippen et al. | |
| 2005/0138653 A1 | 6/2005 | Littrell | |
| 2005/0144641 A1 | 6/2005 | Lewis | |
| 2005/0166224 A1 | 7/2005 | Ficco | |
| 2005/0188400 A1 | 8/2005 | Topel | |
| 2005/0204381 A1 | 9/2005 | Ludvig et al. | |
| 2005/0204382 A1 | 9/2005 | Ellis | |
| 2005/0222903 A1 | 10/2005 | Buchheit et al. | |
| 2005/0256766 A1 | 11/2005 | Garcia et al. | |
| 2005/0259641 A1 * | 11/2005 | Beninato et al. | 370/354 |
| 2006/0004627 A1 | 1/2006 | Baluja | |
| 2006/0015896 A1 | 1/2006 | Su | |
| 2006/0020510 A1 | 1/2006 | Vest | |
| 2006/0026629 A1 | 2/2006 | Harris et al. | |
| 2006/0036495 A1 | 2/2006 | Aufricht et al. | |
| 2006/0041470 A1 | 2/2006 | Filho et al. | |
| 2006/0041477 A1 | 2/2006 | Zheng | |
| 2006/0075432 A1 | 4/2006 | Abbadessa et al. | |
| 2006/0080229 A1 | 4/2006 | Masella et al. | |
| 2006/0100923 A1 | 5/2006 | Courchesne | |
| 2006/0100928 A1 | 5/2006 | Walczak, Jr. et al. | |
| 2006/0168259 A1 | 7/2006 | Spilotro et al. | |
| 2007/0185844 A1 | 8/2007 | Schachter | |
| 2008/0031433 A1 * | 2/2008 | Sapp et al. | 379/92.03 |
| 2008/0123822 A1 * | 5/2008 | Sapp et al. | 379/68 |
| 2008/0298574 A1 * | 12/2008 | Koch | 379/210.02 |
| 2011/0222672 A1 * | 9/2011 | Sapp et al. | 379/88.01 |
| 2011/0286591 A1 * | 11/2011 | Fulton et al. | 379/201.12 |

* cited by examiner

SYSTEM AND METHOD FOR PROVIDING VOICE MESSAGING WITH DYNAMIC CONTENT

CROSS REFERENCE TO RELATED APPLICATIONS

This application is a continuation of U.S. patent application Ser. No. 11/765,756 filed Jun. 20, 2007 now U.S. Pat. No. 7,949,103 which claims the benefit of U.S. Provisional Patent Application Ser. No. 60/815,160 filed Jun. 20, 2006 entitled "System and Method for Providing Messaging with Dynamic Content", both of which are hereby incorporated by reference in their entirety to the extent not inconsistent.

FIELD OF THE INVENTION

The present invention generally relates to telecommunication systems and methods as well as various forms of dynamic content delivery. More particularly, but not exclusively, the present invention pertains to a system and method for providing voice messages including dynamic content to a permission based set of users, including the ability to prompt for and receive responses from a user during a live session and dynamically modify the content presented.

BACKGROUND

There have been attempts to provide content delivery and subscription services. Prior systems have included text messaging services, voice messaging services, and other content delivery and subscription services. Many businesses, political parties, entertainers, and similar organizations have utilized these services to reach out to their customers, members, and fans. Those systems have achieved success, but have been limited by a number of different problems, such as the inability to easily customize content for a large number of recipients. In particular, it would be entirely cost and time prohibitive for a large company wishing to reach its customers to create a unique content segment for each customer. Additionally, when content is created for distribution to a large group of customers, the content loses a personal nature and is more easily disregarded by the user. As such, there is a need for a system in which content targeted to individual users can be created, yet avoids the need to create an enormous library of unique content.

SUMMARY

Various technologies and techniques are disclosed for delivering dynamic voice messages to a permission based set of users. A messaging service receives a list of users from an entity to which a message is to be delivered. Preferably, the users are all permission based users in that they have indicated a willingness to be contacted by the entity. The entity then provides a number of content segments to the service for use in building dynamic voice messages for delivery to the users. In one embodiment, the service constructs a voice message as a serial combination of the various content segments for delivery to a user based upon information contained in the user's associated profile. In a further form, the service connects to the user and presents a number of prompts and generates a voice message for presentation to the user based upon the user's responses.

In yet another embodiment, the service maintains a list of users who have indicated their unwillingness to receive future content. The service then ensures, prior to initiating a communication session, that the designated device of the target user is not on the list. In the preferred embodiment this functionality ensures that each user contacted has provided their permission to the entity on whose behalf the communications are initiated and that they still wish to receive the communications.

This summary is provided to introduce a selection of concepts in a simplified form that are described in further detail in the detailed description and drawings contained herein. This summary is not intended to identify key features or essential features of the claimed subject matter, nor is it intended to be used as an aid in determining the scope of the claimed subject matter. Yet other forms, embodiments, objects, advantages, benefits, features, and aspects of the present invention will become apparent from the detailed description and drawings contained herein.

DESCRIPTION OF THE SPECIFIC EMBODIMENTS

Figure 1:
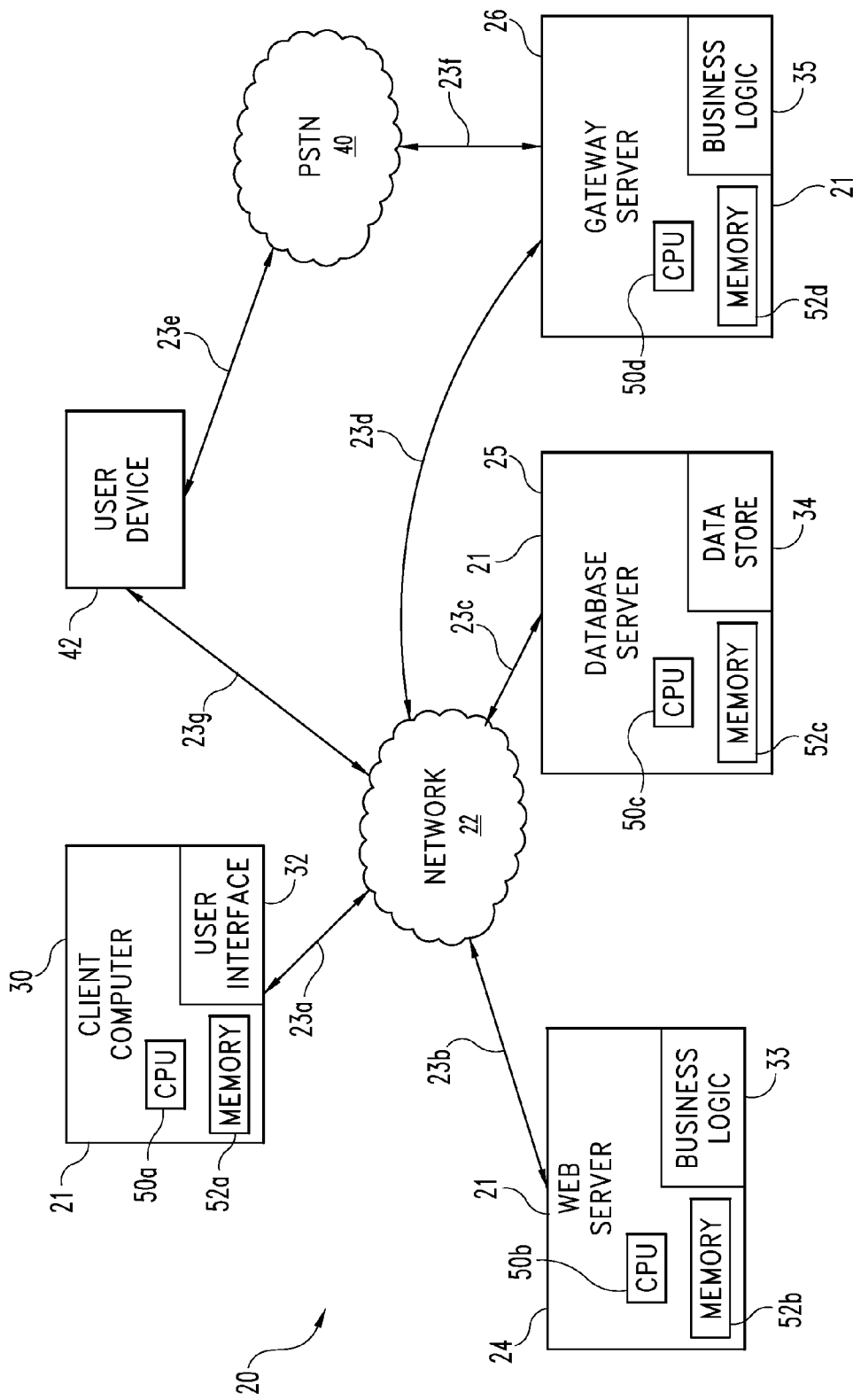
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Disclosed is a dynamic messaging service operated by a service host in conjunction with an entity of interest. The entity supplies a number of content segments to the service host for use in message building. The service then provides a dynamically created message to the designated device of a number of end users indicated by the provider entity. The message may be an audio message suitable for delivery to the user's telephone, a text message deliverable via SMS, a video/animation file, or another form of content capable of being transmitted to any one of a variety of differing user devices. The service host may be compensated for the service by the entity of interest, by the individual end users, through advertisement revenue generated by the placement of advertisements within the content, or through a combination of these or other revenue models.

In a preferred embodiment, the dynamic messaging service delivers content only to permission based end users. In this embodiment, the end user may opt-in to the service using a variety of methods such as by providing their contact information to an entity, dialing a specified phone number, providing information to a web site, sending a text message to a specified number, responding to an e-mail, belonging to an organization, such as a musical artist' fan club, failing to opt out of a prior voice message, or by various other methods known to one of skill in the art.

Turning to FIG. 1, a diagrammatic view of computer system 20 suitable for use in one embodiment of the present invention is shown. Computer system 20 includes computer network 22. Computer network 22 couples together a number of computers 21 over network pathways 23a-23d. Public switched telephone network 40 couples together Gateway Server 26 and user device 42 over pathways 23e-23f. In one form, computers 21 may also be connected to user device 42 through network 22 via network pathway 23g, such as when user device 42 is a VoIP endpoint or other digital communication device. Pathways 23 may also be traditional PSTN connections, digital lines (such as T1, T3, OC3), or any other transmission medium suitable for carrying content, such as a wireless or cellular network.

More specifically, system 20 includes several servers, namely Web Server 24, Database Server 25, and Gateway Server 26. System 20 also includes a client computer 30. While computers 21 are each illustrated as being a server or client, it should be understood that any of computers 21 may be arranged to include both a client and server. Furthermore, it should be understood that while four computers 21 are illustrated, more or fewer may be utilized in alternative embodiments. In particular, it shall be appreciated that a large number of client computers, such as client computer 30, may be in use within system 20 for performing operations such as allowing numerous individual entities to connect to Web Server 24.

Turning to implementation specifics, in the illustrative embodiment, computers 21 include one or more processors or CPUs (50a, 50b, 50c and 50d respectively) and one or more types of memory (52a, 52b, 52c and 52d respectively). Each memory 52a-d preferably includes a removable memory device. Each processor 50a-50d may be comprised of one or more components configured as a single unit. Alternatively, when of a multi-component form, a processor 50a-50d may have one or more components located remotely relative to the others. One or more components of each processor 50a-50d may be of the electronic variety defining digital circuitry, analog circuitry, or both. In one embodiment, each processor 50a-50d is of a conventional, integrated circuit microprocessor arrangement, such as one or more PENTIUM 4 or XEON processors supplied by INTEL Corporation of 2200 Mission College Boulevard, Santa Clara, Calif. 95052, USA.

Each memory 52a-52d (removable or generic) is one form of a computer-readable device. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

Although not shown, in one embodiment each computer 21 is coupled to a display and/or includes an integrated display. Computers 21 may be of the same type, or a heterogeneous combination of different computing devices. Likewise, displays may be of the same type, or a heterogeneous combination of different visual devices. Although not shown, each computer 21 may also include one or more operator input devices such as a keyboard or mouse to name just a few representative examples. Also, besides a display, one or more other output devices may be included such as a printer. As such, various display, input and output device arrangements are possible.

Computer network 22 can be in the form of a wireless or wired Local Area Network (LAN), Municipal Area Network (MAN), Wide Area Network (WAN), such as the Internet, a combination of these, or such other network arrangement as would occur to those skilled in the art. In a further form, several computers 21, such as Web Server 24, Database Server 25, and Gateway Server 26 may be coupled together by a secure portion of network 22 while remaining connected to client computer 30 via an unsecured portion of network 22. The operating logic of system 20 can be embodied in signals transmitted over network 22, in programming instructions, dedicated hardware, or a combination of these. It should be understood that more or fewer computers 21 can be coupled together by computer network 22.

In one embodiment, system 20 operates at one or more physical locations where Web Server 24 is configured to host application business logic 33 for a dynamic message delivery service, Database Server 25 is configured to store content segments received from an entity and end user information, and client computer 30 is configured for providing a user interface 32, for allowing a representative of an entity of interest to interact with the service, such as to enter user information, create/upload content segments, and/or initiate/manage the distribution of a batch of communications. It shall be appreciated that in alternate forms client computer 30 may be any web-enabled device, such as a PDA, Blackberry, or mobile phone, to name just a few illustrative examples. Furthermore, user interface 32 of client computer 30 may be an installable application such as one that communicates with Web Server 24, browser-based, and/or embedded software, to name a few non-limiting examples. In one embodiment, software installed locally on client computers 30 is used to communicate with Web Server 24. In another embodiment, Web Server 24 provides HTML pages, data from web services, and/or other Internet standard or company proprietary data formats to one or more client computers 30 when requested. One of ordinary skill in the art will recognize that the term Web Server 24 is used generically for purposes of illustration and is not meant to imply that network 22 is required to be the Internet.

Additionally, Gateway Server 26 includes business logic 35 and associated hardware allowing operation as a predictive dialer for distributing content to a select group of users retrieved from Database Server 25. In one form Gateway Server 26 may initiate a digital communication session with user device 42 via network 22. In an alternate form Gateway Server 26 may initiate an analog communication session with user device 42 over the PSTN 40. Depending upon the particular arrangement of system 20, user device 42 may be a traditional analog telephone, a mobile telephone, such as one implementing GSM or CDMA technology, or a digital telephone, such as a VoIP phone. It shall be appreciated that more than one user devices will be included in use of system 20, but that only one has been shown to preserve clarity. Further, it shall be appreciated that the types of user devices connected to system 20 need not be of the same type, but that digital, analog, and other technologies may be accommodated simultaneously.

Typical applications of system 20 would include three servers, such as Web Server 24, Database Server 25, and Gateway Server 26, but it will be appreciated by those of ordinary skill in the art that the one or more features provided by those servers could be provided by a single computer or varying other arrangements of computers at one or more physical locations and still be within the spirit of the invention.

Figure 2:
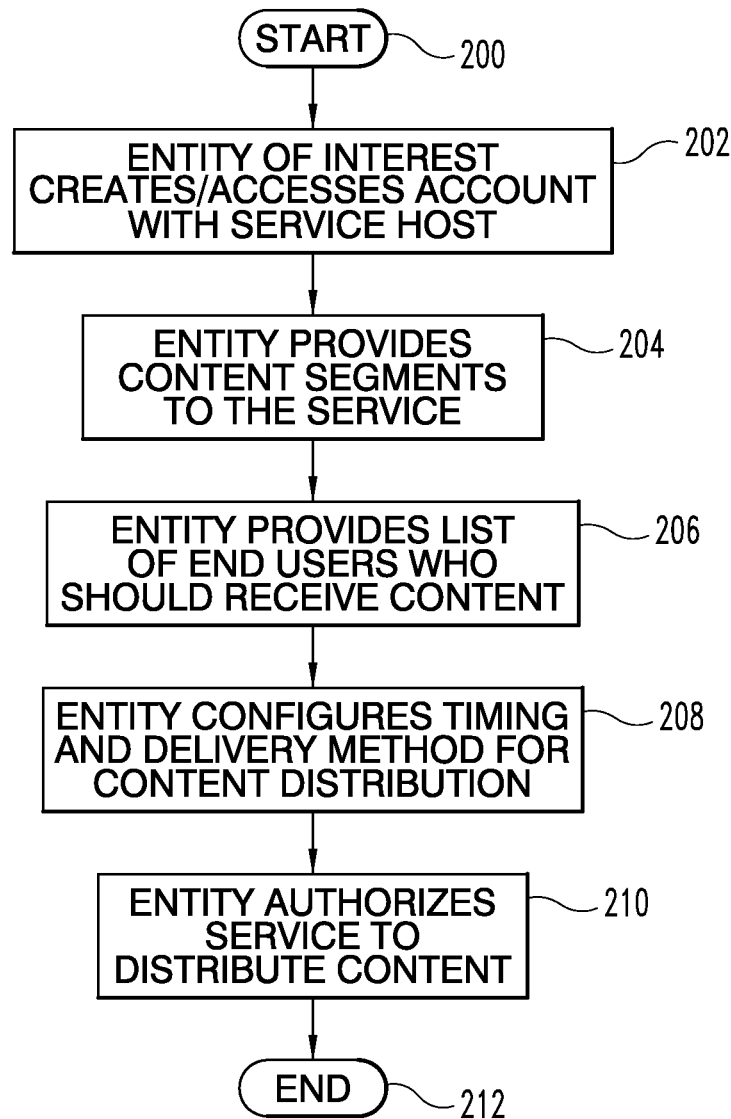
FIG. 2 is a process flow diagram demonstrating one example of the stages involved in configuring content distribution using the service operating on the system of FIG. 1.

Turning to FIG. 2, with continuing reference to FIG. 1, the steps involved with the dynamic message delivery service utilizing system 20 of FIG. 1 to set up a content distribution in collaboration with an entity of interest in one form of the present system and method are illustrated. It shall be appreciated that the entity may be an individual, group, corporation, other business entity, or otherwise and that in the event of a fictional entity, the steps performed by the entity may be performed by an individual or group of individuals such as an authorized representative. It shall be further appreciated that in the following illustrative embodiment the distribution of voice and audio content via telecommunication systems such as telephones will be described for purposes of simplicity, but that the principles described herein may be applied to other forms of content.

The process begins at start point 200 with the entity of interest creating an account or accessing an existing account with the service host (stage 202). In one form, the entity is able to create an account using the web site hosted by Web Server 24 of system 20. Once the account is created and activated, the entity may log into the account through the same web site, such as by using a username and password combination or other web-based authentication method. Once logged in, the entity provides a number of content segments to the service (stage 204) for use in building a dynamic voice message. In the illustrative embodiments, these content segments are individual audio recordings, which may comprise speech, music, jingles, or other audio. In one form, the audio segments are created independently by the entity and uploaded to data store 34 of Database Server 25 from client computer 30 using a web site served by Web Server 24. In an alternate form, the entity may utilize Web Server 24 to request a telephone call from Gateway Server 26 in which the service records the entity to create one or more content segments. The entity is then able to describe the content segments recorded and store them in data store 34 by interacting with the web site presented by Web Server 24. In yet another alternate form, the entity may create or approve scripts so that the service host may arrange for the creation of the audio content segments and their storage in data store 34 for subsequent use in message building.

Figure 3:
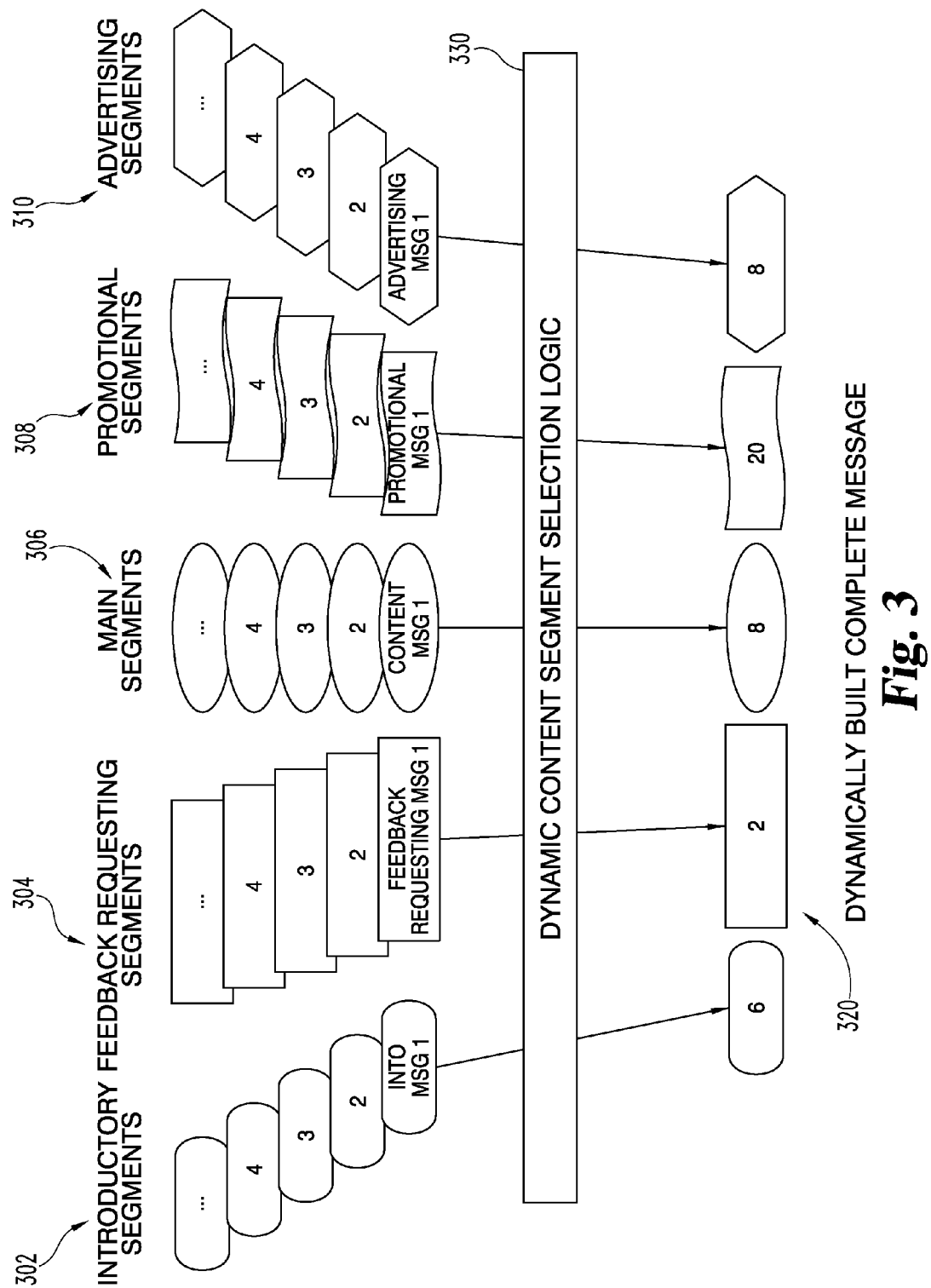
FIG. 3 is a logical view of the content segments provided by the entity in one embodiment.

Turning to FIG. 3, in the illustrative embodiment, the types of content segments created in one form of the illustrative embodiment are shown in a logical form. In this form, the entity creates a plurality of categorized messages, such as a set of introductory segments 302, a set of main segments 306, and a set of promotional segments 308 which may all be used in selective combination to create a complete message. In a further form, the entity or service host may also create or provide a set of advertising segments 310 to be included within a complete message. In another form, the advertising segments 310 may be provided by a third-party, such as a company having an advertising contract with the entity or service host. In a still further form, the entity may create a set of feedback requesting segments 304 used to prompt a user for a response during a live call.

Each content segment of a specific type created by the entity may have similar substance, such as in the case of the introductory segments 302, or each may contain unique or related substance. For example, the set of introductory segments 302 may include several unique segments each including a unique greeting from an individual associated with the entity, while the set of main segments 306 may include unique segments each concerning differing subject matter, but spoken by the same individual. Additionally, the promotional segments 308 may each include the description of a specific opportunity to interact with the entity coming up in a selected geographical area. As seen by complete segment 320, the service may select any number of content segments utilizing dynamic content selection logic 330 and arrange them in a serial fashion to generate a dynamic message suitable for distribution. It shall be appreciated that more than one of a specific type of content segment, such as promotional segment 308, may be included within a complete message. Additionally, not all messages necessarily must contain a content segment selected from each category of content in order to be complete.

Returning to FIG. 2 with continued reference to FIG. 1, once the entity has populated the content segments in stage 204, the entity provides a list of end users to the service (stage 206). As described herein, each end user is preferably a permission based user who has previously opted-in to receiving content from the entity. Each end user listed is stored in data store 34 by Web Server 24 when provided by the entity. Each user in the data store 34 has an associated profile which identifies the device(s) the user has designated for content reception, optional accounting information, and additional information that the entity may have provided or that the service may have collected about the user. For example, in the case of voice messaging, the designated device may be represented by a telephone number. Additionally, the entity may capture demographic information, purchase history information, or any other available information for use by the service. The user profile maintained by the service may also include survey information or any information which may be readily obtained from the user information, such as the user's geographic location from their area code/IP address, or the user's likely demographic from existing information such as their sex and/or date of birth.

Once the entity has populated the content to be delivered in stage 204 and the users who will receive content in stage 206, the entity configures the content delivery to suit its needs (stage 208). In the preferred embodiments, numerous templates exist which allow the entity to easily create content for several different types of users and the messages are then easily constructed from those segments and delivered to the user based upon predetermined selection criteria. The customization in this step of the process is limited only by the information available concerning a user, such as that stored in their associated user profiles, and the number of content segments created by the entity. Examples of the customization possible will be illustrated in examples described below. Once the content delivery configuration is finalized, the entity authorizes the service to begin delivering content to the end users (stage 210). The service provides timing functionality to allow the entity to coordinate when content should be delivered and many other features, such as delivering only so many messages per hour, day, etc. At this point, the entity's configuration is completed and the process ends at stage 212.

Figure 4:
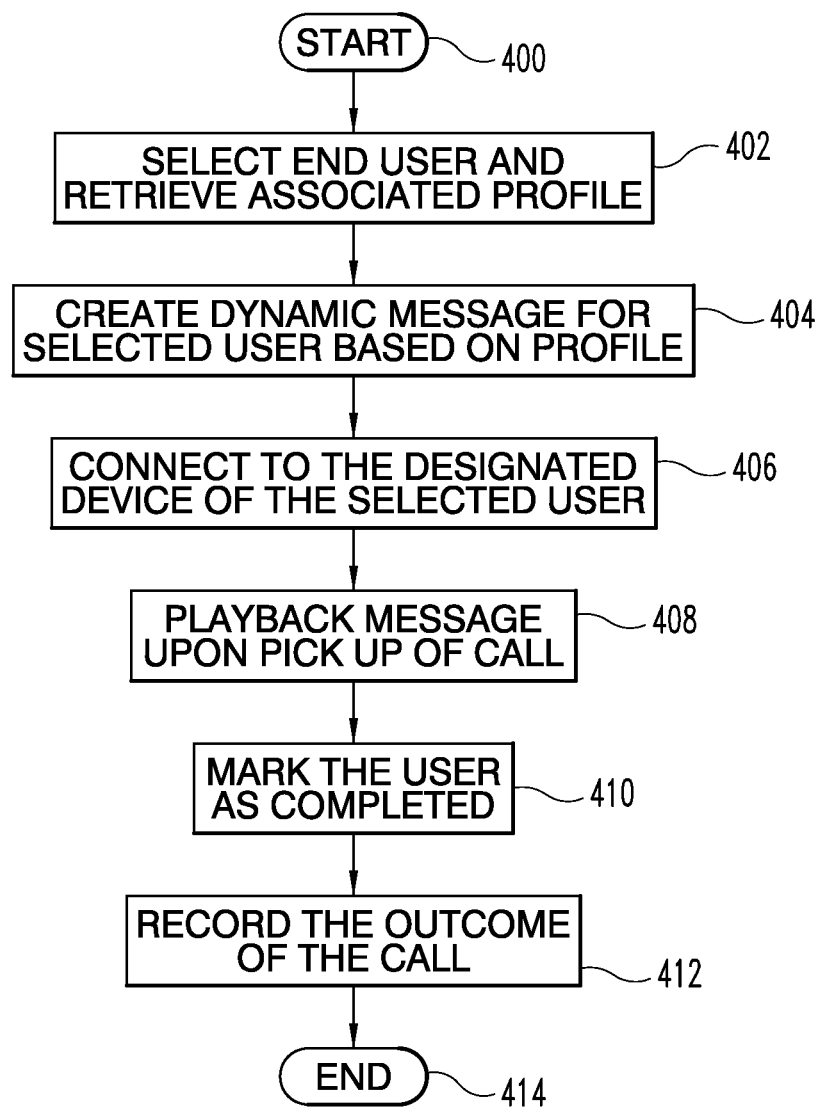
FIG. 4 is a process flow diagram demonstrating one example of the stages involved in constructing and presenting dynamic content to a user in one form of the present system and method.

Turning to FIG. 4, with continued reference to FIG. 1, one form of the process for building and delivering a dynamic voice message prior to live contact is illustrated. It shall be appreciated that system 20 may perform the process illustrated by FIG. 4 with respect to any number of users depending upon the capacity of system 20 contemporaneously and/or consecutively. The process begins at start point 400 with the service selecting an end user and retrieving their associated user profile (stage 402). The service then builds a dynamic message specifically for the user based upon their user profile (stage 404) using the various content segments provided by the entity. The process for building the dynamic message may take many forms, such as a rules based approach selecting various message components from the pre-recorded content segments provided by the entity based upon characteristics of the user as indicated in their user profile. One exemplary method for performing this step is further illustrated in the example which follows the description of the illustrative embodiments. It shall be appreciated that additional content segments may precede or be appended to the complete message. Once the complete message has been created, the service connects to the user, such as by dialing the user using Gateway Server 26 (stage 406). Once the user or the user's answering device, picks up the incoming call, the service plays back the message over the line (stage 408). In one form, the service is capable of recognizing a live answer and the answer of a voicemail service, answering machine or similar device, and delays the playback of the content until recording begins. In alternate forms, the message may not be played back to an answering device if desired by the entity. Once the message is delivered in stage 408, the end user is recorded as having received the message in their associated user profile (stage 410), thereby preventing duplicate contact. Additionally, the service maintains a listing of the outcome of each content distribution to allow reporting back to the entity (stage 412). For example, the status may indicate a completed call and the duration of the call, or the status may indicate that an end user was unavailable, the number had been disconnected, or that the user hung up prior to the completion of the message. The process ends at endpoint 414.

Figure 5:
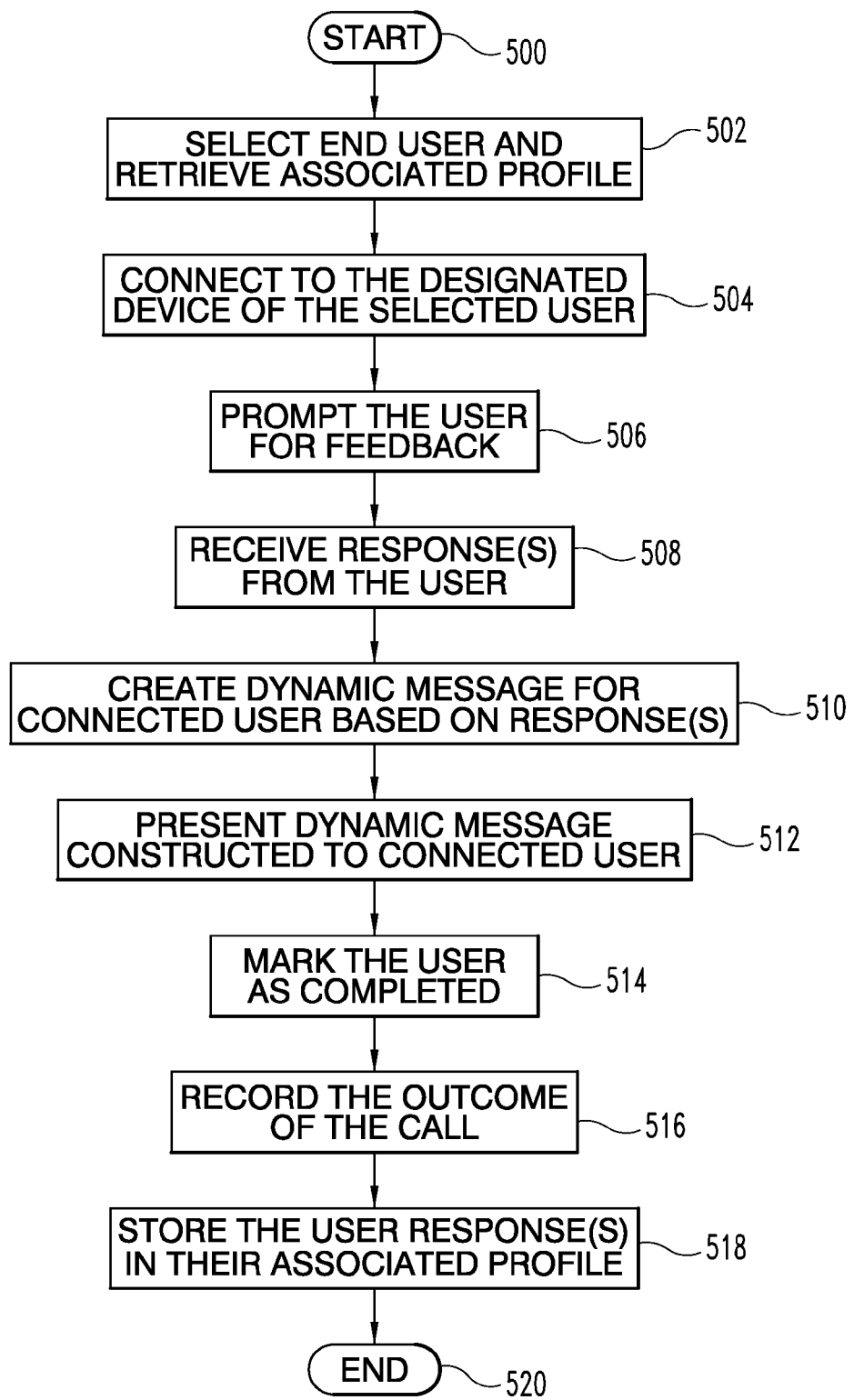
FIG. 5 is a process flow diagram demonstrating another example of the stages involved in constructing and presenting dynamic content to a user in another form of the present system and method.

Turning to FIG. 5, with continued reference to FIG. 1, one form of the process for building and delivering a dynamic voice message during a live contact based upon user feedback is illustrated. As before, it shall be appreciated the system 20 may perform the process illustrated by FIG. 5 with respect to any number of users contemporaneously and/or consecutively. The process begins at start point 500 with the service selecting an end user and retrieving their associated user profile (stage 502). The service then connects to the user, such as by dialing the user using Gateway Server 26 (stage 504) utilizing the designated device stored in the associated user profile as the target. Once the user picks up the line, such as by a live answer identification process, the service preferably provides an introductory content segment followed by prompting the user for feedback (stage 506). The introductory segment may be dynamically selected based on prior user information or generic to each communication. The prompt for feedback may be a question such as a multiple choice question seeking a user response in the form of a keypress (DTMF tone) or spoken response through the use of a voice recognition component. In other forms, the service may prompt the user for a survey response, such as one requiring a numeric response, such as on a scale of one to ten or otherwise. The response may indicate a user interest level, a perceived rating, age, or some other quantifiable response. In a still further form, the service may record the spoken feedback provided by the user for further processing or subsequent transmission to the entity.

Once an appropriate response is received by the service from the currently connected live user, the service constructs a dynamic message in near real-time from the content segments based on the responses received (stage 510). The message is constructed in a similar fashion as that described above, but is based upon just obtained information. It shall be appreciated that the construction of the dynamic message may also be based upon previously acquired information, such as from prior responses during previous calls to the user or upon information stored in the associated user profile. Once created, the voice message is presented to the user over the preexisting live communication session (stage 512).

Following the delivery of the message, the end user is indicated as having received the message in their associated user profile (stage 514), thereby preventing duplicate contact. Additionally, the service maintains a listing of the outcome of each content distribution to allow reporting back to the entity (stage 516). For example, the status may indicate a completed call and the duration of the call, or the status may indicate that an end user was unavailable, the number had been disconnected, or that the user hung up prior to the completion of the message. Additionally, the service preferably stores the responses received from the user during the live call to the user's associated user profile to prevent duplicate questioning of a user or for later use in message building (stage 518). The process ends at endpoint 520.

As illustrated by the previous embodiment, the service creates a complete message dynamically for each user specified by the entity. Each complete message is dynamically created from the plurality of content segments created or approved by the entity. In one preferred embodiment, the complete messages are created based upon the information stored in the profile associated with each user. In another preferred embodiment, the complete messages are created based upon responses received from a user during a live communication session. In a further preferred form, the complete messages may be based upon both of the previous types of information. As such, a first user may receive a completely distinct message from that received by a second user. By utilizing this arrangement, a large combination of unique complete messages may be dynamically constructed from the relatively smaller sets of categorized content segments, allowing a provider to offer a high personalized and targeted message to each individual user.

In another form, users may be grouped into smaller classifications based upon the information in their associated records. For instance, a group of female users may receive one message while male users would receive another. In another example, a set of prospective customers may receive one message, while a set of prior customers may receive a different renewal message.

Figure 6:
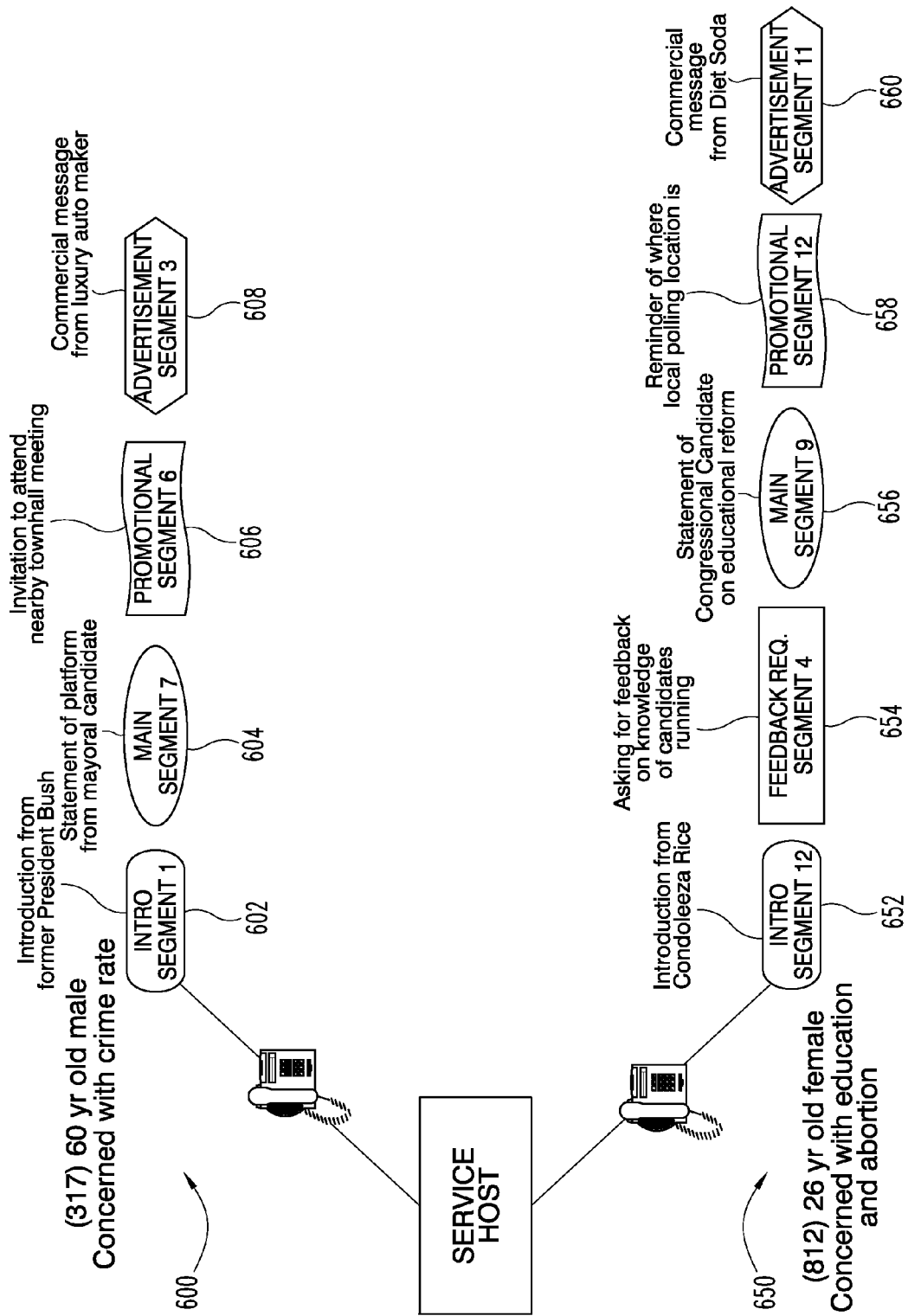
FIG. 6 is a plan view illustrating an example of the creation and delivery of dynamic content according to one form of the present system and methods.

For purposes of illustration, one hypothetical example of the operation of the service will be provided with reference to FIG. 6. The example includes two users who are voters affiliated with a certain political party, and that political party is the entity of interest sponsoring the content distribution. The entity, such as by way of a campaign manager, logs on to the website of the service, or provides their information as part of a registration process, and begins the configuration of the content distribution. The political party uploads a list of registered voters, such as a list of those who have entered their phone number in a box on the party's web site requesting to be contacted by the party. The political party then creates a plurality of categorized content segments. For example, in preparation for an upcoming election, a party may create a set of introductory segments greeting the user. Each message may be spoken by a different well-respected politician within the party. Additionally, a set of main segments may be recorded by a number of candidates within the party running for election. These main segments may include an introduction to the candidate, the candidate's views on one or more issues, or some other message. Furthermore, the party also creates a set of promotional segments, which may notify users of upcoming political rallies, round-table discussions, community forums, teleconferences, or provide a reminder of the user's designated polling place and time.

The service host then dynamically creates a completed message targeted to the first selected user 600, which may be subsequently distributed to the user at their designated phone number. In this example, the first user 600, is a 60 year old man who has indicated his concern over the growing crime rate. Based upon information obtained and provided by the party, the service is aware that the man is a strong proponent of former President George Bush. As such, the service selects intro segment 602, a welcome greeting from George Bush. The call may then include a main segment 604 from the Republican Party candidate running for mayor in the man's hometown. Additionally, the call may include a promotional segment 606 inviting the man to attend a town hall meeting taking place the next night near the man's home in which the mayoral candidate will discuss the town's crime rates and what he/she plans to do to lower them. The promotional segment 606 is selected due to its proximity to the zip code from the man's home address stored in his associated user profile. By being presented with a function located close by, the likelihood of the man's participation is greatly increased.

At the same time, a second user 650 who is a young female voter with concerns about education and abortion may receive a call having an introductory segment 652 containing a welcome greeting from a prominent female leader within the party such as Condoleezza Rice. The introductory segment 652 may be selected by the service because the user 650 is a female. The call then prompts the user 650 with a feedback requesting segment 654 which prompts the user for their thoughts on various candidates within the party. The call may then include a message from the Republican Party candidate running for Congress in the woman's district. The message may include the candidate explaining his/her reasons for supporting educational reform, his/her prior voting history concerning this issue, and their support of strictly regulating abortion. This message is selected based upon the response provided by the user 650 to the feedback requesting segment 654. In this example, the user 650 may have indicated a lower level of knowledge of the candidates running for Congress in her district. Additionally, the call may also include a promotional segment 658 which reminds the user 650 to vote and also alerts the user 650 to the address of her designated polling station.

According to a further form, the service may also provide advertising segments within one or more complete messages. With respect to the above example, advertising segments 608 and 660 may be selected as targeted advertisements from a collection of advertisements provided by the entity or by the service host. The targeted advertisements are preferably selected for inclusion based upon the user profile and their responses. As such, the advertisement segment 608 is an advertisement for a luxury auto maker which would target an older male demographic, while advertisement segment 660, selected for user 650, is for a diet soda company which may target a younger female audience.

Figure 7:
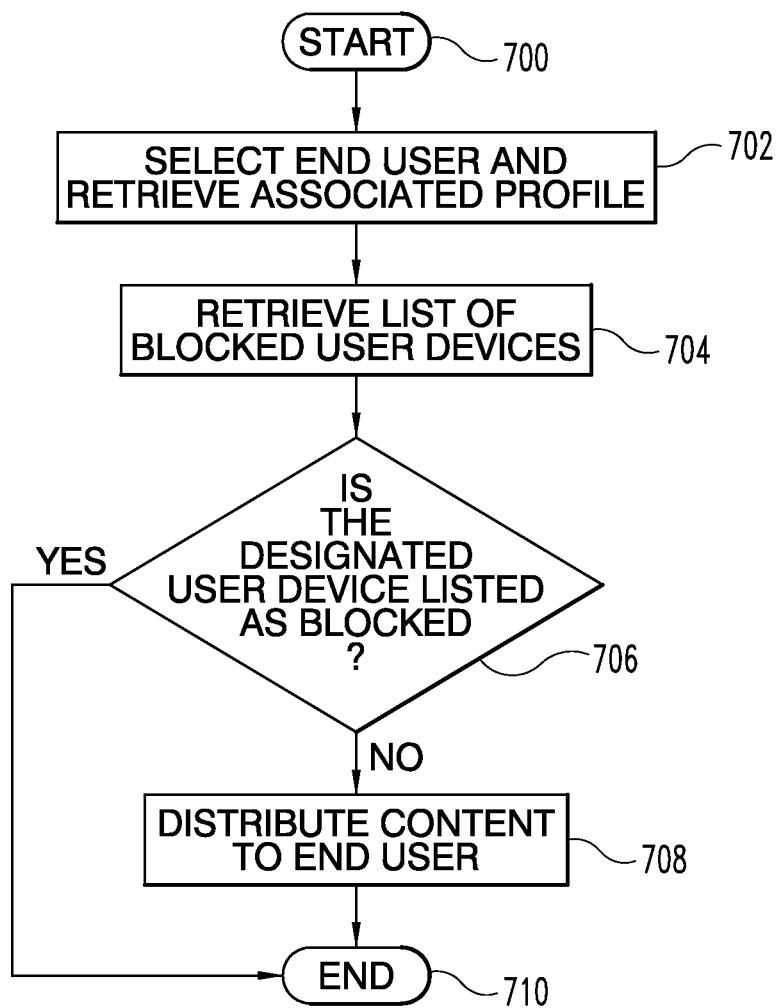
FIG. 7 is a process flow diagram illustrating one example of the stages involved in blocking content delivery to users so requesting in one form of the present system and method.

Turning to FIG. 7, the process for preventing the distribution of content to globally opted-out users is illustrated. This optional feature allows an end user to block the content distribution of the service despite the receiving of a listing of end users containing the user's device. Therefore, no matter which entity requests content to be sent to the user's device, the end user has the authority to elect not to be contacted at all. The process begins at start point 700 with the service selecting a user for content distribution (stage 702). The service then retrieves a persistent global list of blocked user devices (stage 704). The list of blocked devices may be created by allowing users to sign up for the block list via the service host's website, another website, sending a letter, by opting out during a live communication, or other means. The designated device stored in the associated user profile is checked for its presence in the list (stage 706), which may be a listing of blocked telephone numbers. If the device is not listed in the blocked list, then the content distribution is allowed to proceed (stage 708). If the device is on the list, then the content distribution is blocked and the process ends at stage 710.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

What is claimed is:

1. A method for delivering voice messages containing dynamic content to a plurality of permission based users on behalf of a predetermined entity comprising the steps of:
   creating a first user profile associated with a first permission based user;
   populating said first user profile with information pertaining to said first permission based user;
   storing a plurality of audio content segments associated with said predetermined entity;
   creating a first voice message comprising a subset of said plurality of audio content segments based at least upon said first user profile; and
   delivering said first voice message to said first permission based user via an outgoing telecommunication session.

2. The method of claim 1, wherein said first user profile includes a telephone number associated with said first permission based user.

3. The method of claim 2, wherein said first user profile includes a gender, age, and geographic location of said first permission based user.

4. The method of claim 2, wherein said first user profile includes a transaction history between said first permission based user and said predetermined entity.

5. The method of claim 4, wherein said transaction history includes at least a partial listing of previous purchases made by said first permission based user.

6. The method of claim 4, wherein said transaction history includes a listing of previous voice messages sent to said first permission based user.

7. The method of claim 4, wherein said transaction history includes an interaction between the entity and said first permission based user.

8. The method of claim 7, wherein said interaction is an e-mail.

9. The method of claim 7, wherein said interaction is a post to an electronic forum.

10. The method of claim 7, wherein said interaction is comment in response to a blog post.

11. The method of claim 6, wherein said listing of previous voice messages includes an indication of whether at least one voice message was received live by said first permission based user.

12. The method of claim 6, wherein said listing includes an amount of said voice message received by said first permission based user.

13. The method of claim 6, wherein the listing of previous voice messages includes an indication that the voice message was delivered to a voicemail or answering device of said first permission based user.

14. The method of claim 2, wherein said plurality of audio content segments are audio recordings.

15. The method of claim 14, wherein said audio recordings are recorded during a telecommunication session established in response to a request submitted to an interactive web-site.

16. The method of claim 14, wherein said audio recordings are stored in digital files.

17. The method of claim 16, wherein said digital files are provided by said predetermined entity.

18. The method of claim 2, wherein said plurality of audio content segments are generated by a text to speech algorithm.

19. The method of claim 1, wherein said first voice message is comprised of a subset of 20 said plurality of audio content segments arranged in series.

20. The method of claim 1, wherein said first voice message is comprised of a subset of said plurality of audio content segments and one or more advertisement segments arranged in series.

21. The method of claim 20, wherein said one or more advertisement segments are selected from a plurality of stored advertisement segments associated with an entity other than said predetermined entity based upon said first user profile.

22. The method of claim 1, wherein said permission based user for purposes of said delivering is a voicemail box or answering machine associated with said first permission based user.

23. A method for preventing delivery of voice messages to a specific listing of users comprising the steps of:
- receiving over a communications network a request from a user indicating that said user no longer wishes to be contacted including a telephone number associated with said user;
- adding said telephone number to a database listing of blocked telephone numbers within a server connected to the communication network;
- receiving over the communications network a request to automatically deliver a voice message to a user device of a permission based user at a specified telephone number; and
- blocking the dialing of said specified telephone number to the user device when said specified telephone number matches an entry within said database listing of blocked telephone numbers at the server.

24. The method of claim 23, wherein said request is received through a web page.

25. The method of claim 23, wherein said request is received as a DTMF tone during a live telephone call.

26. The method of claim 23, wherein said request is spoken by said permission based user and received by a voice recognition algorithm.

27. The method of claim 23, wherein said request is received as an e-mail.

* * * * *